United States Patent
Kazirskis et al.

[11] Patent Number: 5,169,593
[45] Date of Patent: Dec. 8, 1992

[54] CONTROL ROD DRIVE HANDLING TOOLS FOR NUCLEAR REACTOR

[75] Inventors: Benedict Kazirskis, Barto; Edward L. Wrobel, Pottstown, both of Pa.

[73] Assignee: General Electric Company, San Jose, Calif.

[21] Appl. No.: 432,284

[22] Filed: Nov. 3, 1989

[51] Int. Cl.$^5$ ............................................. G21C 19/20
[52] U.S. Cl. ...................................................... 376/260
[58] Field of Search ......................................... 376/260

[56] References Cited

U.S. PATENT DOCUMENTS

| | | | |
|---|---|---|---|
| 4,288,290 | 9/1981 | Saima et al. | 376/260 |
| 4,292,133 | 9/1981 | Sasaki et al. | 376/260 |
| 4,801,427 | 1/1989 | Turner et al. | 376/260 |

FOREIGN PATENT DOCUMENTS

| | | |
|---|---|---|
| 58-27880 | 6/1958 | Japan . |
| 53-18676 | 6/1978 | Japan . |
| 61-36635 | 9/1980 | Japan . |
| 61-36636 | 9/1980 | Japan . |
| 57-39398 | 8/1982 | Japan . |
| 57-49833 | 10/1982 | Japan . |
| 57-49834 | 10/1982 | Japan . |
| 58-15759 | 3/1983 | Japan . |
| 58-32359 | 7/1983 | Japan . |
| 59-31034 | 7/1984 | Japan . |
| 60-35035 | 8/1985 | Japan . |
| 60-35036 | 8/1985 | Japan . |
| 60-37439 | 8/1985 | Japan . |
| 60-46676 | 10/1985 | Japan . |
| 60-48715 | 10/1985 | Japan . |
| 60-49277 | 10/1985 | Japan . |
| 61-13198 | 4/1986 | Japan . |
| 61-22274 | 5/1986 | Japan . |
| 61-22275 | 5/1986 | Japan . |
| 61-25116 | 6/1986 | Japan . |
| 61-31839 | 7/1986 | Japan . |
| 61-33158 | 7/1986 | Japan . |
| 61-42838 | 9/1986 | Japan . |
| 61-42839 | 9/1986 | Japan . |

OTHER PUBLICATIONS

Electric Power Research Institute, EPRI NP-3895, Project 2410-1, Mar. 1985.

Primary Examiner—Daniel D. Wasil
Attorney, Agent, or Firm—Robert R. Schroeder

[57] ABSTRACT

A low-headroom tower is pivotably mounted to a trunnion cart that runs on rails in a slot in a work platform located in the sub-pile room of a reactor containment. An elevator in the tower raises an extension piece into contact with the bottom of a control rod drive. A detorquing guide is rotationally positioned to coincide with bolts holding the control rod drive in place. The elevator places an upward force on the control rod drive during detorquing of the bolts. This provides reaction torque to aid in bolt loosening and prevents leakage of contaminated effluent past the seal. A detorquing tool is fitted into the detorquing guide and is spring loaded to engage a selected bolt securing the control rod drive. An indexing device provides alignment for the detorquing tool with each succeeding bolt. The elevator is lowered until the bottom end of the control rod drive enters the tower. The load is transferred from the extension piece directly to the elevator. Lowering continues until the top end of the control rod drive emerges from the reactor vessel. Normally retracted rear wheels are attached to the tower. A winch rotates the tower to the horizontal position, and the rear wheels are extended to engage with the rails to permit rolling horizontal movement of the tower.

2 Claims, 11 Drawing Sheets

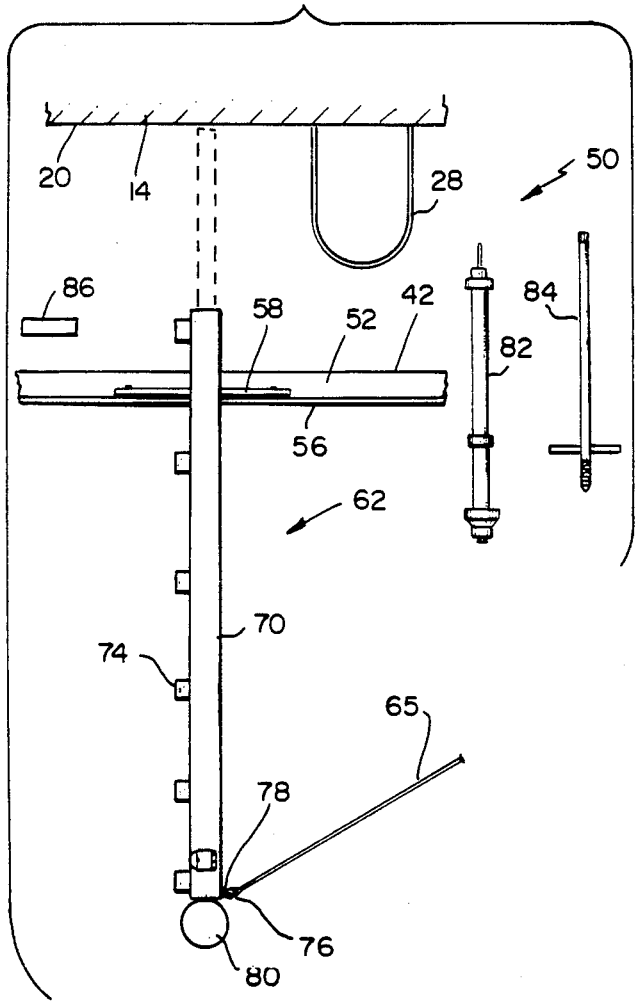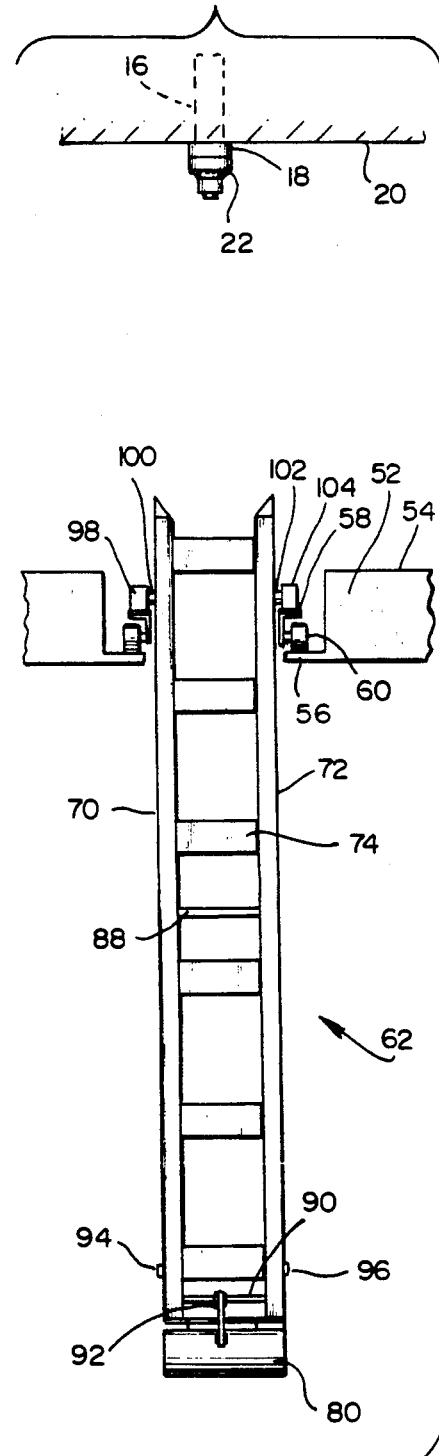

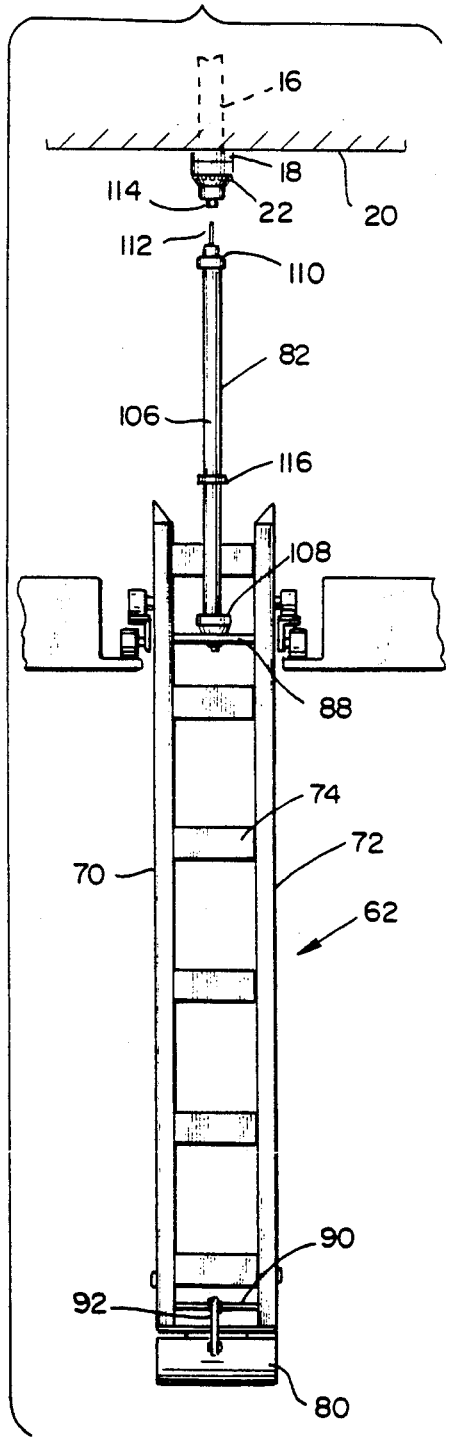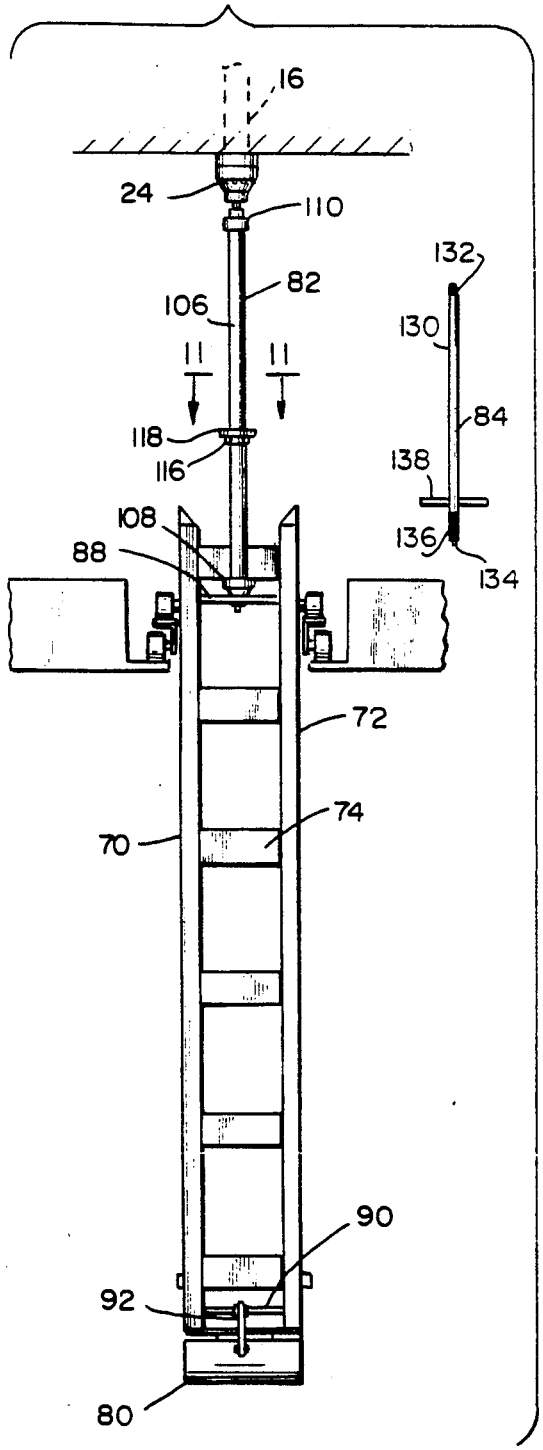

CONTROL ROD DRIVE HANDLING TOOLS FOR NUCLEAR REACTOR

BACKGROUND OF THE INVENTION

The present invention relates to nuclear reactors and, more particularly, to tools for removing and installing control rod drives for commercial power nuclear reactors.

A boiling-water nuclear reactor employs a plurality of fuel rods containing a nuclear fuel within a reactor vessel. The reactor vessel is filled with water to a level at least sufficient to cover the fuel rods. Fission in the fuel rods releases heat that boils the water surrounding them. This steam is used, either directly, or through an intermediate heat exchanger, to perform a useful function such as, for example, driving an electric turbine-generator.

The intensity of the nuclear reaction in a nuclear reactor is controlled, in part, by moving control rods between fuel rods. The control rods absorb neutrons, thereby controlling the intensity of the nuclear reaction, and the rate at which steam is produced.

The control rods are controlled by control rod drives inserted through the bottom of the reactor vessel. Control rod drives occasionally require maintenance or replacement. This has presented a problem because of the structure of the control rod drives and the working environment in which they must be handled.

A typical control rod drive is about 16 feet long and weighs about 450 pounds. It is thus an awkward device that requires substantial mechanical handling assistance to install and remove. In addition, the sub-pile room below the reactor vessel typically has a headroom between the floor and the bottom of the reactor vessel of about 18 feet. This leaves little maneuvering room for lowering the control rod drive, rotating it into a horizontal position, and moving it out of the sub-pile room. Also, numerous fragile instrumentation cables hang down from the bottom of the reactor vessel. Such instrumentation cables can be damaged by contact with a control rod drive. If an instrumentation cable is damaged, the rules governing operation of a nuclear reactor require that work must stop until the damaged instrumentation cable is repaired.

A further problem arises because the sub-pile room below a nuclear reactor is a high-radiation area. It is thus desirable to limit the amount of time that workers spend in that area.

The following publications relate to devices which are used to lower and rotate a control rod drive in the sub-pile room. All of these publications are in Japanese, and full translations are not available. A translation of claim 1 is available and is provided for the use of the Patent and Trademark Office:
Japanese Patent Publication No. 60-48715
Japanese Patent Publication No. SHO-60-49277
Japanese Patent Publication No. SHO-61-31839
Japanese Patent Publication No. 58-32359
Japanese Patent Publication No. SHO-61-36636
Japanese Patent Publication No. 61-42838
Japanese Patent Publication No. SHO-61-42839
Japanese Patent Publication No. SHO-61-36635
Japanese Patent Publication No. SHO-61-33158
Japanese Patent Publication No. SHO-61-25116
Japanese Patent Publication No. SHO-61-13198
Japanese Patent Publication No. SHO-57-39398
Japanese Patent Publication No. 57-49833
Japanese Patent Publication No. SHO-58-27880
Japanese Patent Publication No. 59-31034
Japanese Patent Publication No. SHO-60-35035
Japanese Patent Publication No. SHO-60-35036
Japanese Patent Publication No. 60-37439
Japanese Patent Publication No. SHO-60-46676

The length of the above list is regretted. However, the spirit of full disclosure requires the inclusion of each reference of which the applicants are aware.

Also, as the seal between a control rod drive and the reactor vessel is broken during removal, a small amount of residual water spills from in the reactor vessel. Usually, the spilling water, which is contaminated with radioactivity, falls upon a worker in the process of removing the control rod drive. Although workers wear protective clothing and breathing apparatus in this area, it is considered undesirable to permit residual water to fall upon them. Japanese Utility Model Application Publication No. 57-49834, and Japanese Patent Publication Nos. SHO-58-15759 and SHO-53-18676 disclose water drain apparatus for use with control rod drives.

Bolts securing a control rod drive are highly torqued during installation. Due to the cramped conditions in the sub-pile room, it is difficult to maneuver suitable tools into place to detorque these bolts to enable their removal. Japanese Patent Publication Nos. SHO-61-22274 and SHO-61-22275 disclose tools designed to remove such bolts.

OBJECTS AND SUMMARY OF THE INVENTION

It is an object of the invention to provide tools for handling control rod drives that overcome the drawbacks of the prior art.

It is a further object of the invention to provide a handling tool for a control rod drive that permits positive control of the control rod during all stages of the removal process.

It is a still further object of the invention to provide a handling tool for a control rod drive that reduces the likelihood of damaging instrumentation cables below a reactor vessel.

It is a still further object of the invention to provide a handling tool for a control rod drive that reduces the time required for removing and installing a control rod drive.

Briefly stated, the present invention provides a low-headroom tower that is pivotably mounted to a trunnion cart. The trunnion cart runs on rails in a slot in a work platform located in the sub-pile room of a reactor containment. An elevator in the tower raises an extension piece into contact with the bottom of a control rod drive. A detorquing guide is rotationally positioned to coincide with bolts holding the control rod drive in place. The elevator places an upward force on the control rod drive during detorquing of the bolts. This provides reaction torque to aid in bolt loosening and prevents leakage of contaminated effluent past the seal. A detorquing tool is fitted into the detorquing guide and is spring loaded to engage a selected bolt securing the control rod drive. An indexing device provides alignment for the detorquing tool with each succeeding bolt.

The elevator is lowered until the bottom end of the control rod drive enters the tower. The load is transferred from the extension piece directly to the elevator. Lowering continues until the top end of the control rod drive emerges from the reactor vessel. A winch pivots the tower to the horizontal position about the trunnion cart, and rear wheels are engaged with the rails to permit rolling horizontal movement of the tower. An effluent container clamps around the control rod drive to channel away contaminated water that passes through the broken seal as the control rod drive experiences its first movement. A two-piece radiation shield pig is preset onto guide rods to clamp quickly onto the top end of the control rod drive.

According to an embodiment of the invention, there is provided apparatus for handling a control rod drive for a nuclear reactor, comprising: a tower positionable below the nuclear reactor, means for lowering and raising the control rod drive a substantial distance within the tower, and means for rotating the tower, containing the control rod drive, between a horizontal and a vertical position, whereby transfer of the control rod drive is enabled.

According to a feature of the invention, there is provided a method for handling a control rod drive for a nuclear reactor, comprising: positioning a tower below the nuclear reactor, lowering and raising the control rod drive a substantial distance within the tower, and rotating the tower, between a horizontal and a vertical position, whereby transfer of the control rod drive is enabled.

According to a further feature of the invention, there is provided a method for removing a control rod drive from a nuclear reactor, comprising: positioning a tower below the control rod drive, engaging an upper end of an extension piece with the control rod drive, lowering the extension piece and the control rod drive a first portion of a distance required to clear the control rod drive from the nuclear reactor, removing the extension piece, continuing lowering the control rod drive a remainder of the distance until the control rod drive is clear of the nuclear reactor, and rotating the tower, with the control rod drive therein, to a horizontal position, whereby horizontal displacement of the control rod drive is enabled.

According to a still further feature of the invention, there is provided a method for installing a control rod drive in a nuclear reactor, comprising: rolling a horizontal tower, containing the control rod drive, into position below the nuclear reactor, rotating the tower, and the control rod drive, into a substantially vertical position wherein a top end of the control rod drive is generally aligned with a predetermined point on a bottom of the nuclear reactor, raising the control rod drive a first portion of a distance required to install it in the nuclear reactor, transferring a load of the control rod drive to an extension piece, and continuing raising the control rod drive a remainder of a distance required to install it in the nuclear reactor.

According to another feature of the invention, there is provided apparatus for removing a control rod drive from a nuclear reactor, comprising: a tower, means for positioning the tower below the control rod drive, an extension piece, means for engaging an upper end of the extension piece with the control rod drive, means for lowering the extension piece and the control rod drive a first portion of a distance required to clear the control rod drive from the nuclear reactor, means for removing the extension piece, means for continuing to lower the control rod drive a remainder of the distance until the control rod drive is clear of the nuclear reactor, and means for rotating the tower, with the control rod drive therein, to a horizontal position, whereby horizontal displacement of the control rod drive is enabled.

According to still another feature of the invention, there is provided a torque breaker for breaking torque of a plurality of bolts securing a control rod drive of a nuclear reactor, the bolts being disposed in a first pattern, comprising: an extension piece, means for engaging the extension piece with a bottom of the control rod drive, a torque breaker tool, engagement means at a first end of the torque breaker tool, the engagement means being effective for rotationally engaging one of the plurality of bolts, an indexing guide affixed to the extension piece, support means at a second end of the torque breaker tool, pivoting means at a second end of the torque breaker tool, means in the indexing guide for pivotably engaging the pivoting means, the indexing guide including means for indexing to a plurality of predetermined positions about a circle, the plurality of predetermined positions being of the same number as the plurality of bolts, means for permitting rotation of the indexing guide to an angular position providing vertical alignment of one of the plurality of positions with one of the plurality of bolts, means for maintaining a fixed relationship between the indexing guide relative to the plurality of bolts, and means for permitting engagement of the engagement means with successive ones of the plurality of bolts, whereby torque of the plurality of bolts is broken.

According to a still further feature of the invention, there is provided a torque breaker for breaking a torque of a plurality of bolts in a control rod drive, the bolts being disposed in a predetermined pattern, comprising: an extension piece, means for engaging the extension piece with a bottom of the control rod drive, a torque breaker tool, an indexing guide affixed to the extension piece, the indexing guide defining a plurality of positions corresponding to the predetermined pattern, means for aligning the indexing guide in an aligned position wherein one of the plurality of positions is aligned with one of the bolts, whereby all of the plurality of positions are aligned with corresponding bolt positions, means for locking the indexing guide in the aligned position, the indexing guide including means for retaining a bottom end of the torque breaker tool at any selectable one of the plurality of positions, an engaging portion at a top end of the torque breaker tool, the engaging portion including means for engaging an aligned one of the bolts, means for exerting torque on the torque breaker tool, whereby the one of the bolts is loosened, and means for indexing the torque breaker tool to a next one of the plurality of positions, whereby a next one of the bolts may be loosened.

According to a still further feature of the invention, there is provided an effluent container for catching a burst of effluent from a nuclear reactor when a control rod drive is removed therefrom: a rod, means for moving the rod into forcible contact with a bottom of the control rod drive, the forcible contact being effective for avoiding substantial leakage of the effluent from the control rod drive, first and second halves of a water container, each of the first and second halves including a semi-cylindrical sidewall and a semi-circular bottom, each of the bottoms including a semi-circular cutout, the semi-circular cutouts being fitted together to form a circular hole generally conforming to a peripheral surface of the rod, means for conducting a liquid from the liquid container, the liquid container being fittable over a bottom of the control rod drive including a location from which effluent leakage is expected, a clamp cylinder fittable over the liquid container, the clamp cylinder being effective for holding the first and second halves of the liquid container together, and means on the clamp cylinder for permitting retention of the clamp cylinder while the liquid container is slid downward therethrough.

According to a still further feature of the invention, there is provided a radiation shield pig assembly for shielding a filter end of a control rod drive as it exits a nuclear reactor, comprising: first and second guide rods affixed below the nuclear reactor adjacent opposed sides of the control rod drive, a first hanger assembly, first means for temporarily affixing the first hanger assembly on the first guide rod, a second hanger assembly, second means for temporarily affixing the second hanger assembly on the second guide rod, a first semi-cylindrical half shield, first quick-release means for affixing the first semi-cylindrical half shield to the first hanger assembly, a second semi-cylindrical half shield, second quick-release means for affixing the second semi-cylindrical half shield to the second hanger assembly, means for clamping abutting edges of the first and second semi-cylindrical half shields to form a cylindrical radiation shield, means for clamping the cylindrical radiation shield to the control rod drive, and means for releasing the first and second semi-cylindrical half shields from the first and second hanger assemblies, whereby the cylindrical radiation shield may remain on the control rod drive during movement thereof.

According to a still further feature of the invention, there is provided a method for shielding an end of a control rod drive of a nuclear reactor, comprising: affixing first and second guide rods below the nuclear reactor adjacent opposed sides of the control rod drive, temporarily affixing a first hanger assembly on the first guide rod, temporarily affixing a second hanger assembly on the second guide rod, affixing a first semi-cylindrical half shield to the first hanger assembly, affixing a second semi-cylindrical half shield to the second hanger assembly, clamping together abutting edges of the first and second semi-cylindrical half shields to form a cylindrical radiation shield, clamping the cylindrical radiation shield to the control rod drive, and releasing the first and second semi-cylindrical half shields from the first and second hanger assemblies, whereby the cylindrical radiation shield may remain on the control rod drive during movement thereof.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7 is a side view of the control rod drive handling system of FIG. 6.

FIG. 8 is a front view of the control rod drive handling system of FIG. 6.

FIG. 9 is a front view of the control rod drive handling system showing an early stage in the removal of a control rod drive.

FIG. 10 is a front view of the control rod drive handling system showing a later stage in the removal of a control rod drive.

DETAILED DESCRIPTION OF THE PREFERRED EMBODIMENT

Figure 1:
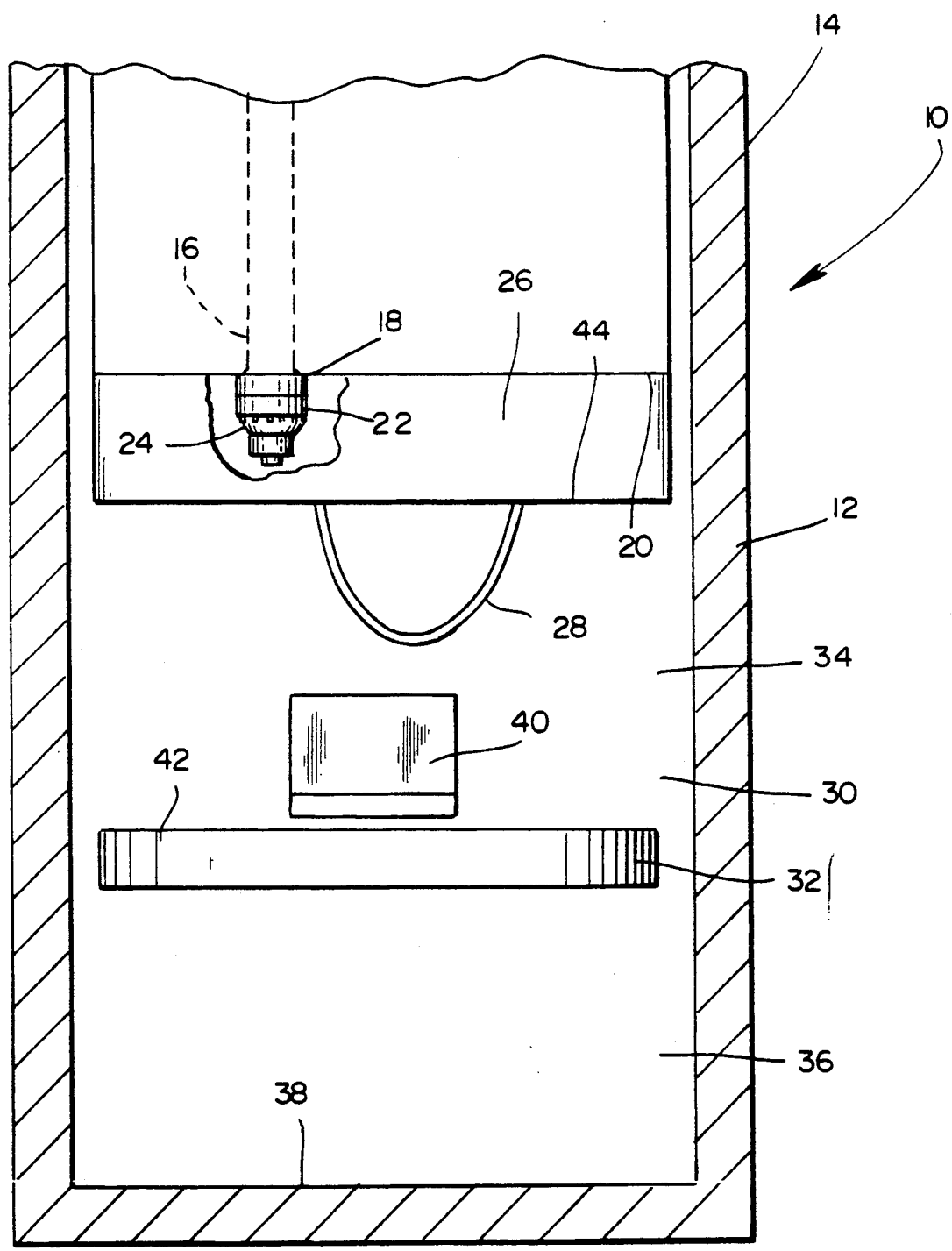
FIG. 1 is a simplified cross section of a portion of a containment and a reactor vessel.

Referring first to FIG. 1, there is shown, generally at 10, a nuclear reactor having a containment 12 with a reactor vessel 14 therein. It will be recognized by one skilled in the art that different nuclear reactors 10 may have numbers and dimensions which may vary from the illustrative example used in the preceding. The apparatus and methods of the present invention are equally adaptable to such other systems.

A control rod drive 16, which may be one of, for example, 180 such items, is affixed in reactor vessel 14 using a flange 18 affixed to a bottom 20 of reactor vessel 14 that mates with a flange 22 affixed to control rod drive 16. Flanges 18 and 22 are urged together by a ring of bolts 24. A criss-cross pattern of heavy steel plates 26 form eggcrate compartments below bottom 20 to surround external parts of control rod drive 16, to catch control rod drives 16 in case of an accident, and for protection of instrumentation (not shown) affixed below bottom 20. An inverted jungle of relatively fragile instrumentation cables 28 is suspended below bottom 20 (only one instrumentation cable 28 is represented in the figure to reduce clutter).

A sub-pile room 30 in containment 12 below reactor vessel 14 is divided by a rotatable work platform 32 into an upper portion 34 and a lower portion 36. A floor 38 is located at the bottom of lower portion 36. A door 40 in containment 12 permits entry and exit of personnel and equipment.

In a typical nuclear reactor 10, sub-pile room 30 measures about 18 feet from floor 38 to bottom 20. A typical control rod drive 16 is about 16 feet long. There is thus a minimum of maneuvering room for lowering control rod drive 16 and upending it for passage through door 40. Work platform 32 is positioned so that its work surface 42 is about five to seven feet below a bottom 44 of steel plates 26. This permits workers on work surface 42 to reach items mounted on bottom 20, but it also provides a relatively cramped workspace.

Figure 2:
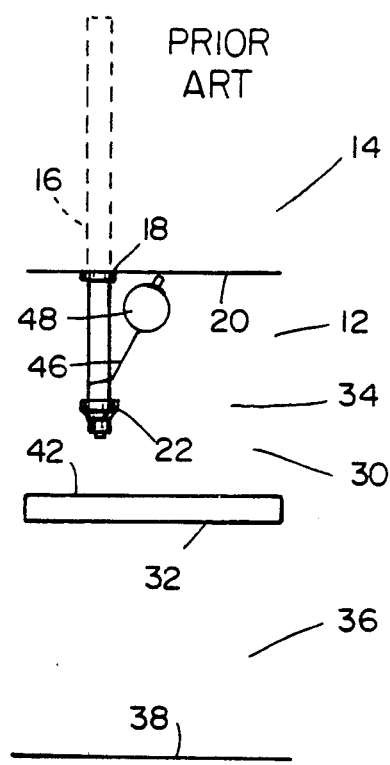
FIGS. 2-5 are steps in the conventional manner used for removing a control rod drive from a nuclear reactor.

Referring now to FIG. 2, there is shown an early step in the removal of a control rod drive 16. Elements not necessary to the following description are omitted.

Figure 3:
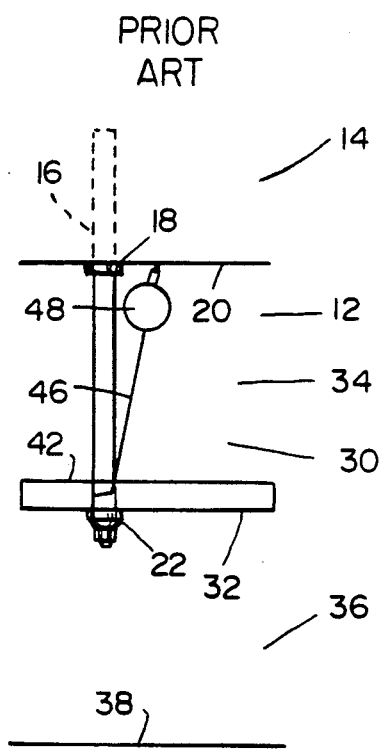

Bolts 24 are removed and a cable 46 of a hoist 48 is attached to control rod drive 16. Referring now to FIG. 3, control rod drive 16 is lowered until the balance point of control rod drive 16 has emerged from flange 18. It will be noted that, at this time, the bottom of control rod drive 16 is below work platform 32. A slot in work platform 32 provides for this.

Figure 4:
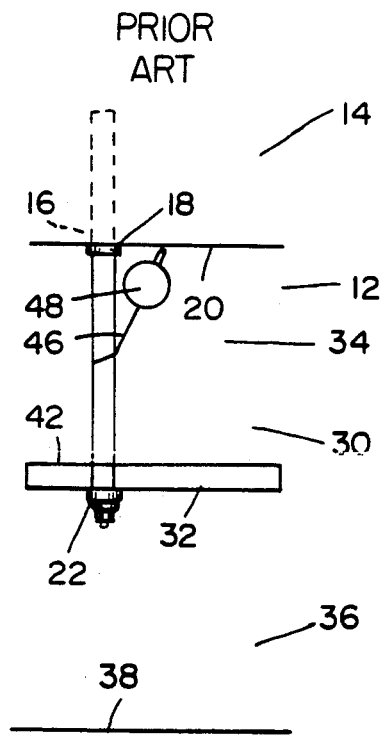

Referring now to FIG. 4, cable 46 is re-rigged at the balance point of control rod drive 16.

Figure 5:
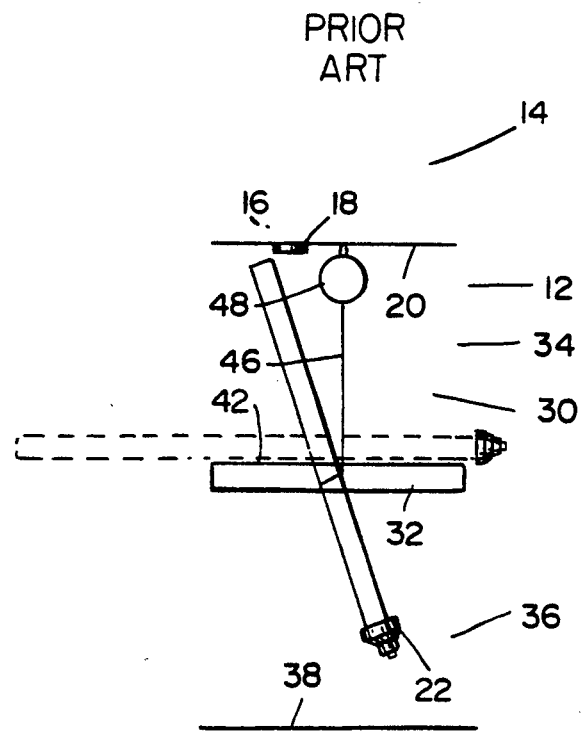

Referring now to FIG. 5, lowering continues until the top of control rod drive 16 clears flange 18, as shown in solid line. Then control rod drive 16 is rotated about its balance point to the horizontal condition, as shown in dashed line. Once in the horizontal position, it may be removed from sub-pile room 30 using, for example, a trolley cart (not shown).

It should be evident that the rigging, rerigging, lowering and rotating steps in the prior art technique provide less than optimum control of control rod drive 16 during the process. The poor control of control rod drive 16 presents a substantial danger of damage to instrumentation cables (not shown in FIGS. 2–5). Also, the manual method consumes substantial time. It is estimated that a crew of four workers is capable of removing or installing about two control rod drives 16 in an eight-hour shift. This low level of productivity is worsened if an instrumentation cable is damaged and has to be repaired before proceeding.

Figure 6:
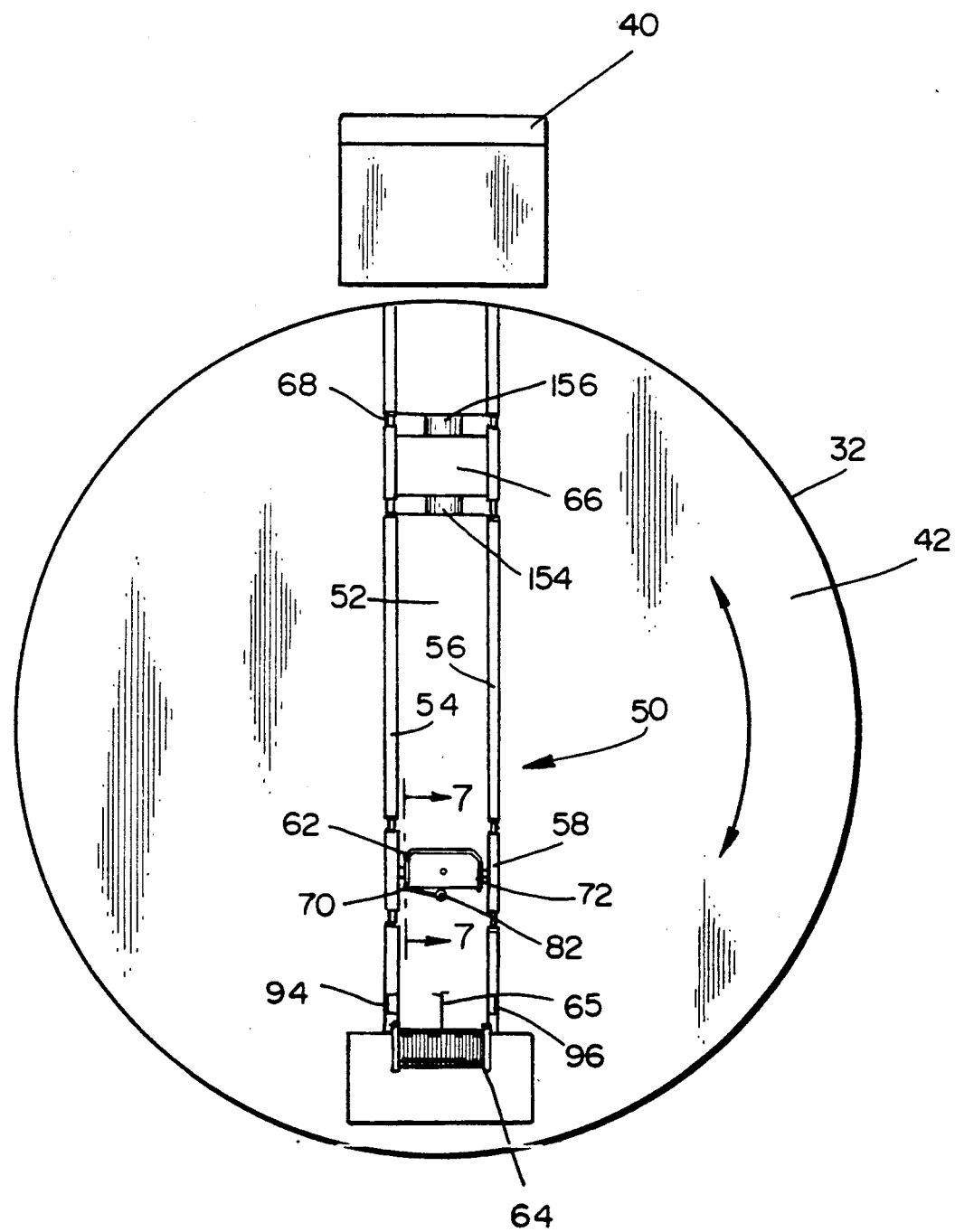
FIG. 6 is a top view of a control rod drive handling system according to an embodiment of the invention.

Referring now to FIG. 6, there is shown, generally at 50, a handling system according to the present invention. A slot 52 in work surface 42 includes opposed support rails 54 and 56. A trunnion cart 58 includes a plurality of wheels 60 rolling on rails 54 and 56. Trunnion cart 58 supports a tower 62. A winch 64 is affixed to work platform 32 at one end of slot 52. A cable 65 is paid out from winch 64 for attachment to the bottom of tower 62, as will be explained. A lead cart 66, whose structure and function will be described later, is rollably supported on rails 54 and 56 by a plurality of wheels 68.

Referring now to FIG. 7, tower 62 includes first and second facing side rails 70 and 72 (side rail 72 is hidden by side rail 70 in FIG. 7). Side rails 70 and 72 are tied together by a plurality of cross braces 74. Cable 65 is affixed near the bottom of side rail 70 by any convenient means such as, for example, a safety hook 76 on cable 65 engaging an eye 78 on side rail 70. An hoist motor 80 is affixed at the bottom end of side rail 70. An extension piece 82, used at various stages of removal and installation of a control rod drive, is shown alongside tower 62. A torque breaker 84 and a load transfer plate 86 are also shown.

Referring now to the front view of tower 62 in FIG. 8, an elevator platform 88 is driveable upward and downward between side rails 70 and 72 by actuation of hoist motor 80. Any convenient means for transferring motion from hoist motor 80 to elevator platform 88 may be employed. In one embodiment of the invention, a cross shaft 90 is driven through a roller chain 92 from hoist motor 80. An endless roller chain (not shown) inside side rail 70, and a further endless roller chain (not shown) inside side rail 72, are driven by cross shaft 90. The ends of elevator platform 88 are connected to the two roller chains whereby, as cross shaft 90 rotates, elevator platform 88 is moved upward or downward. Other techniques for driving elevator platform 88 would be evident to one skilled in the art, and thus do not require further elaboration.

A retractable wheel 94 is affixed near the lower end of side rail 70. Similarly, a retractable wheel 96 is affixed near the lower end of side rail 72. In the retracted position shown, the maximum transverse dimension through retractable wheels 94 and 96 is less than the spacing between rails 56, whereby retractable wheels 94 and 96 can pass therethrough. Later in the operation of the system, tower 62 is rotated until retractable wheels 94 and 96 are above rails 56. Then retractable wheels 94 and 96 are moved into their unretracted positions. The end of tower 62 may then be lowered until retractable wheels 94 and 96 contact the upper surfaces of rails 56 to support tower 62.

It is to be noted that the transverse dimension of hoist motor 80 is less than the space between rails 56. This permits rotation of tower 62 to move hoist motor 80 upward between rails 56 during a stage of operation of the system.

A journal shaft 100, extending from side rail 70, is rotatably engaged in a trunnion bearing 98 on one trunnion cart 58. Similarly, a journal shaft 102, extending from side rail 72, is rotatably engaged in a trunnion bearing 104 on the other trunnion cart 58.

Referring now to FIG. 9, the apparatus of the invention is shown in an early stage of use. Extension piece 82 includes a shaft 106 having a support 108 at its lower end for engaging elevator platform 88. A cylindrical bearing 110 supports an upward-pointing locating pin 112. Locating pin 112 is sized to enter an axial hole 114 in the bottom of control rod drive 16. An indexing guide 116 is disposed about an intermediate point on shaft 106. A detorque yoke 118 is installed above indexing guide 116.

Referring now to FIG. 10, in the next stage in removal of control rod drive 16, elevator platform 88 is raised until locating pin 112 enters axial hole 114 (neither of which are seen in FIG. 10). Cylindrical bearing 110 permits a limited rotation of locating pin 112 to facilitate its entry into, and alignment with axial hole 114. Initially, elevator platform 88 is positioned so that no upward force is applied to the bottom of control rod drive 16. This permits extension piece 82 to be rotated, as desired.

Figure 11:
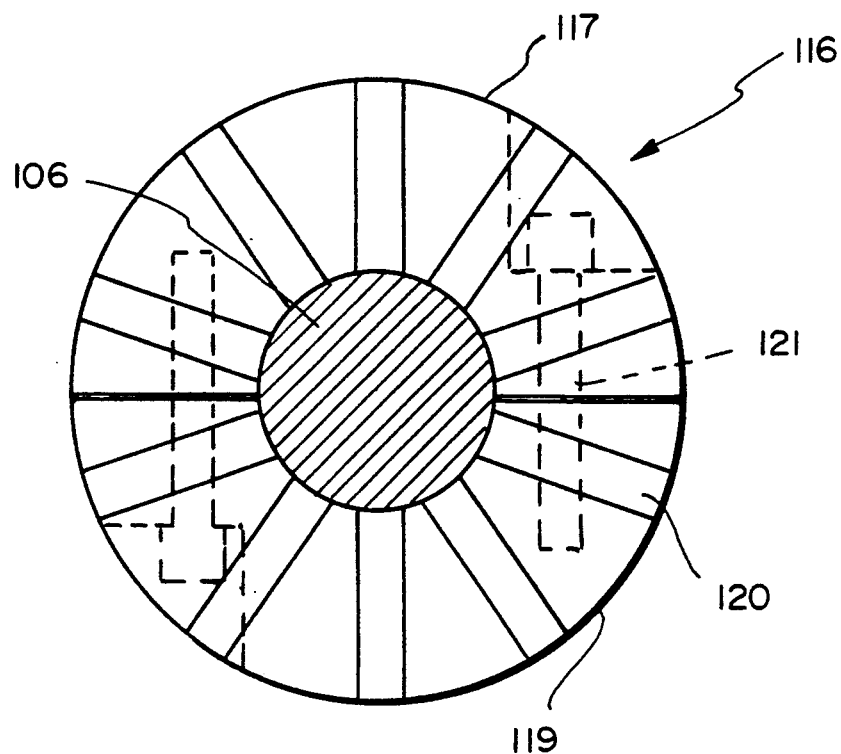
FIG. 11 is a top view of a detent collar.

Referring momentarily to FIG. 11, indexing guide 116 is formed of first and second semi-circular halves 117 and 119, permanently installed on shaft 106 using, for example, bolts 121. A plurality of radial slots 120, equal in number to bolts 24 securing control rod drive 16 are formed in an upper surface. Radial slots 120 give indexing guide 116 an appearance similar to a castellated nut.

Figure 11A:
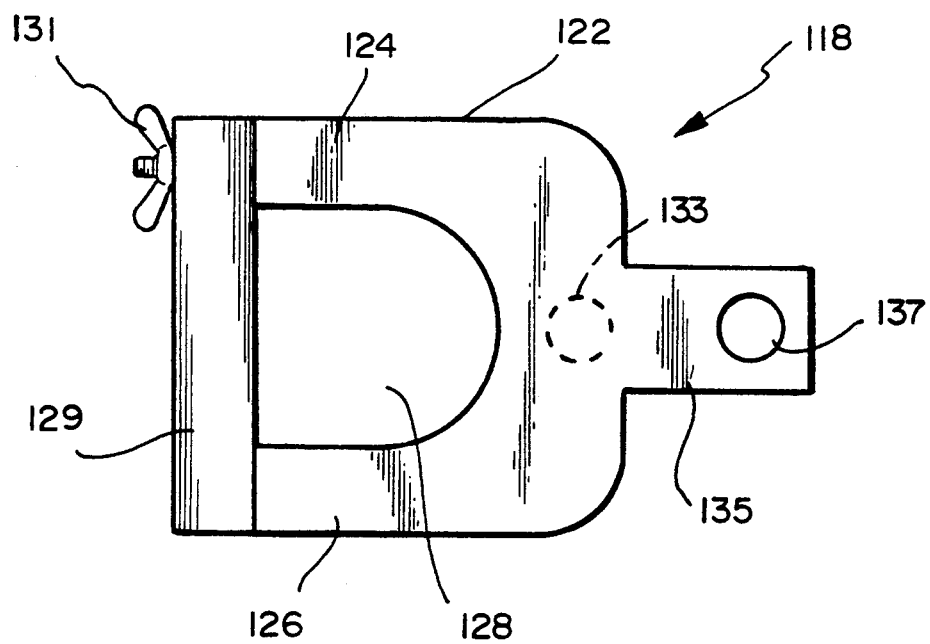
FIG. 11A is a top view of a detorque yoke.

Referring now to FIG. 11A, detorque yoke 118 includes a wishbone-shaped member 122 having first and second legs 124 and 126 enclosing a gap 128. A closing bar 129 is secured in place closing gap 128 using, for example, a nut 131. A boss 133, on the underside of detorque yoke 118, engages a selected one of radial slots 120, as will be explained hereinafter. A hole 137 is sized to permit the entry thereinto of a lower end of torque breaker 84.

Returning now to FIG. 10, torque breaker 84 includes a shaft 130 having a socket-engaging portion 132 at one end thereof, and a guide rod 134 at the other. A coil spring 136 covers at least part of guide rod 134. A handle 138 is fitted in torque breaker 84 above coil spring 136. Guide rod 134 is sized to fit into hole 137. The length of shaft 130 is such that, guide rod 134 may be pressed downward into a hole 137, thereby compressing coil spring 136 to permit socket-engaging portion 132 to be moved into alignment with a bolt 24. When downward force on torque breaker 84 is removed, coil spring 136 urges socket-engaging portion 132 upward into full engagement with a bolt 24, while guide rod 134 remains within hole 137.

Figure 12:
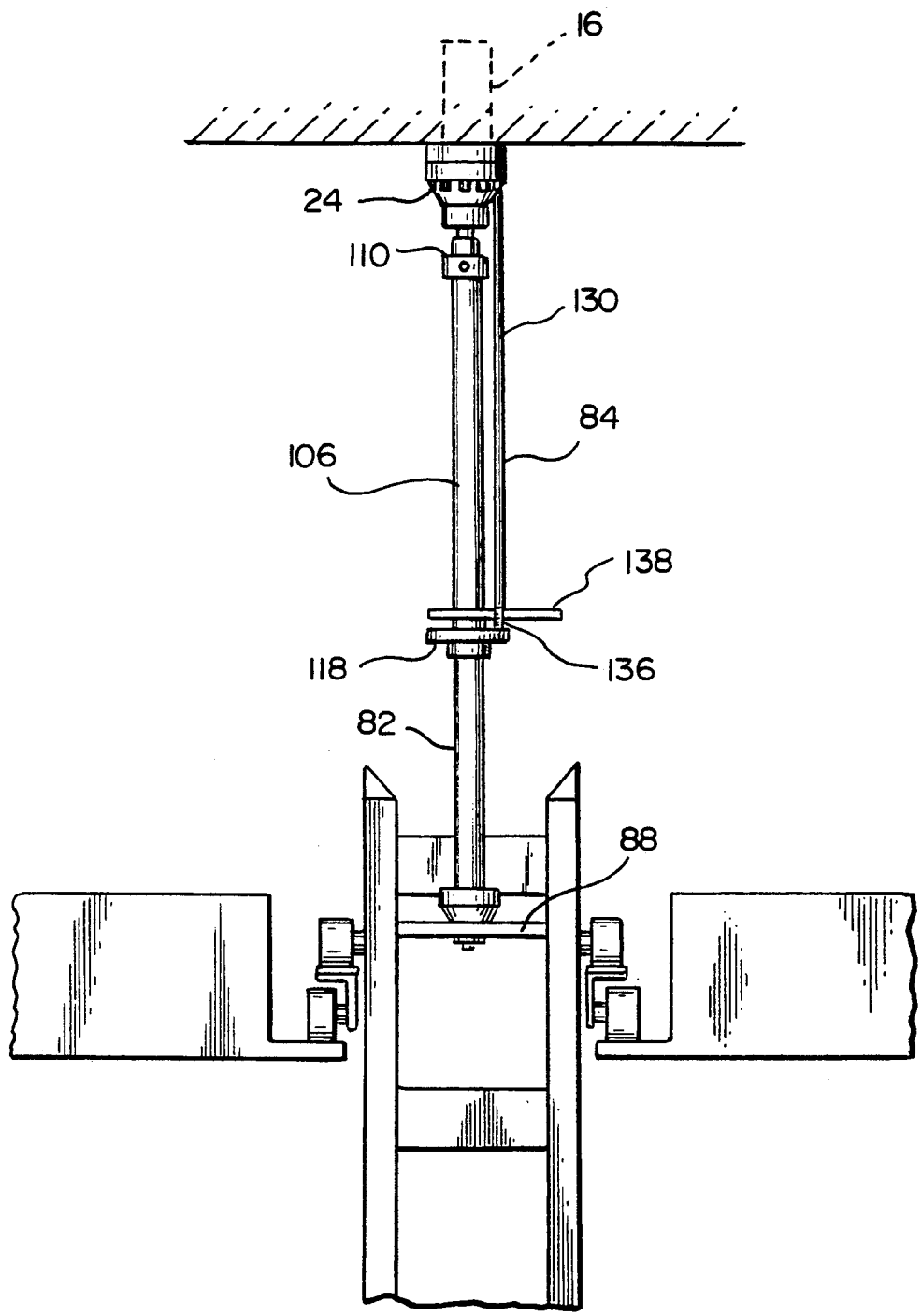
FIG. 12 is a close-up front view of a portion of the control rod handling system showing a torque breaker installed for loosening holding bolts.

The engaged position of torque breaker 84 is shown in FIG. 12.

In an initial adjustment, while extension piece 82 is held in the unforced position shown in FIG. 10, extension piece 82 is rotated until radial slots 120 in indexing guide 118 are aligned below respective ones of bolts 24. Selection of this alignement may be aided by installing detorque tool 84 in hole 137 and in one of bolts 24. When substantial rotational alignment is attained, elevator platform 88 is urged upward by hoist motor 80 until a substantial upward force is exerted on the bottom of control rod drive 16 by extension piece 82. This force is sufficient to hold extension piece 82 in the selected rotational position and to provide reaction torque to permit adequate torque to be applied to bolt 24 by manual actuation of handle 138. In one embodiment of the invention, the full upward drive capability of hoist motor 80 is applied and maintained during the detorquing of bolts 24. The applied upward force of about 1000 pounds was adequate to permit detorquing of bolts 24 which are installed with a torque of 800 foot-pounds.

Once one of bolts 24 is loosened, boss 133 is disengaged from a radial slot 120, and detorque yoke 118 is rotated until hole 137 is aligned below a next selected bolt 24. Since radial slots 120 are generally aligned with bolts 24, the new position of detorque yoke 118 is certain to align hole 137 vertically with the selected bolt 24.

Numerous conventional mechanisms could be substituted for the apparatus described above for providing the indexing function. A detailed discussion of such conventional mechanisms is considered unnecessary to satisfy the disclosure requirements of the present application.

It is found most productive to use torque breaker 84 only to break the initial torque. Once all of bolts 24 are loosened slightly, torque breaker 84 is removed, and all bolts 24 can be removed rapidly with a low-powered electric or pneumatic drive.

Figure 13:
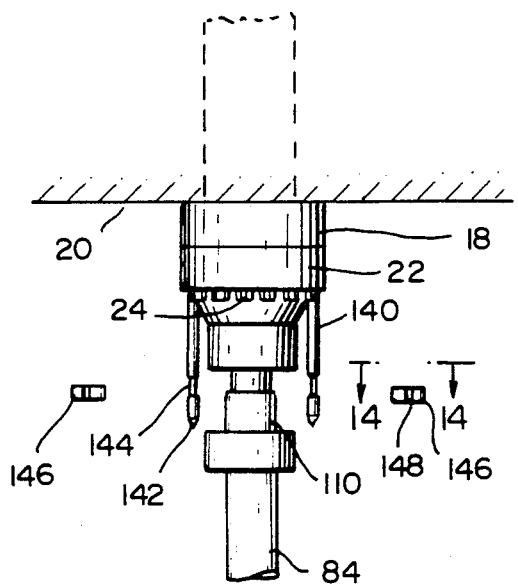
FIG. 13 is a close-up side view of the bottom of the control rod drive showing the installation of guide rods and safety blocks.
Figure 14:
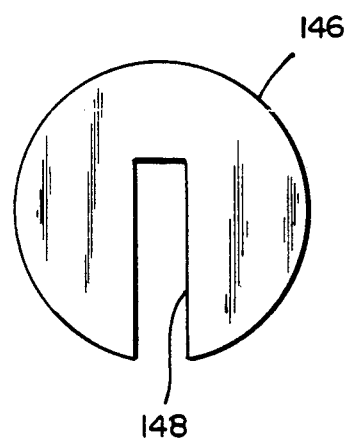
FIG. 14 is a top view of a safety block

Referring now to FIGS. 12 and 13, as a preferable next step in the removal of control rod drive 16 one pair of diametrically opposite bolts 24 are removed and a pair of guide rods 140 are screwed, hand tight, in their place. Each guide rod 140 includes a tapered tip 142 at its end, and a narrow diameter portion 144 in an intermediate location. A safety block 146 is installed on the narrow diameter portion 144 of each guide rod 140.

Each safety block 146 includes a slot 148 having a width permitting it to fit onto narrow diameter portion 144, and to prevent it from being forced axially along guide rod 140. Thus, in the event that control rod drive 16 is released accidentally, safety blocks 146 stop downward motion of control rod drive 16 after only a small amount of motion has taken place.

When a maintenance operation requires removal of a control rod drive 16 and its reinstallation or replacement, guide rods 140 are permitted to remain in place after removal, or are installed in preparation for reinstallation. The presence of guide rods 140 simplifies attaining correct linear and rotational alignment of flange 22 with flange 18.

Figure 15:
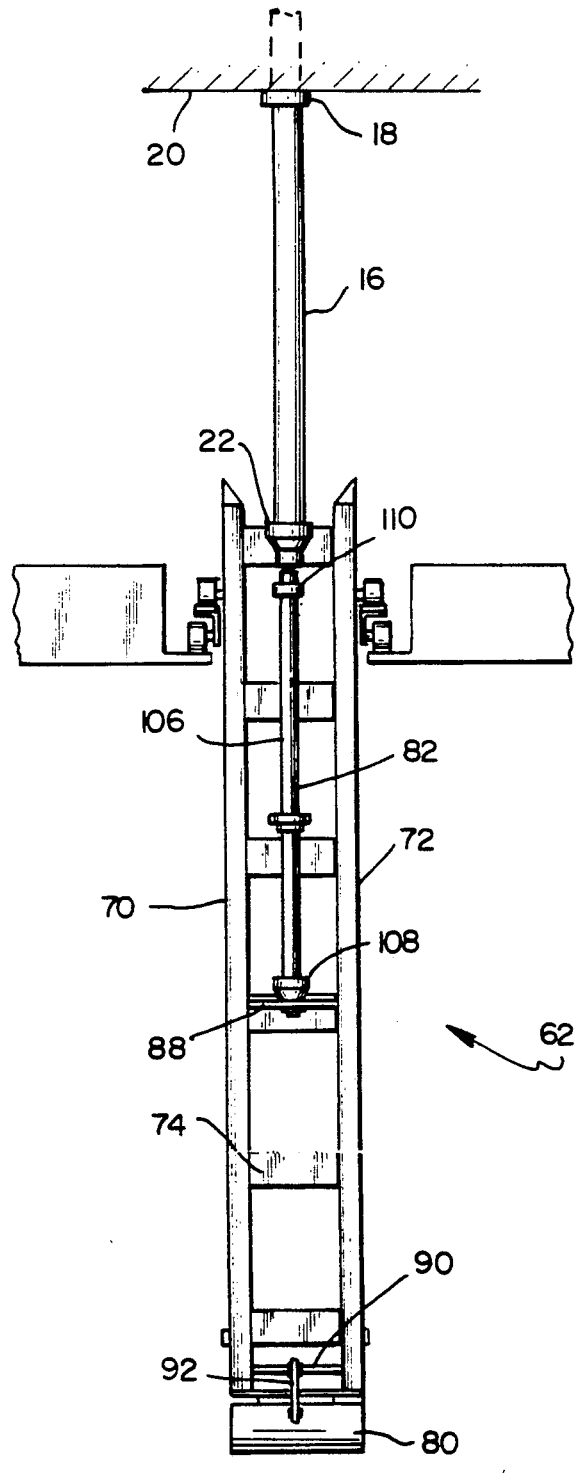
FIG. 15 is a front view of the control rod drive handling system showing a later stage in the removal of a control rod drive.

Referring now to FIG. 15, elevator platform 88 is lowered until the bottom of control rod drive 16 enters the top of tower 62. Conventional guiding elements at the top of tower 62, which may be employed to stabilize extension piece 82 during the process of reaching the condition shown, are omitted to reduce clutter in the figure. At this point, extension piece 82 must be removed so that control rod drive 16 can be further lowered into tower 62.

Figure 16:
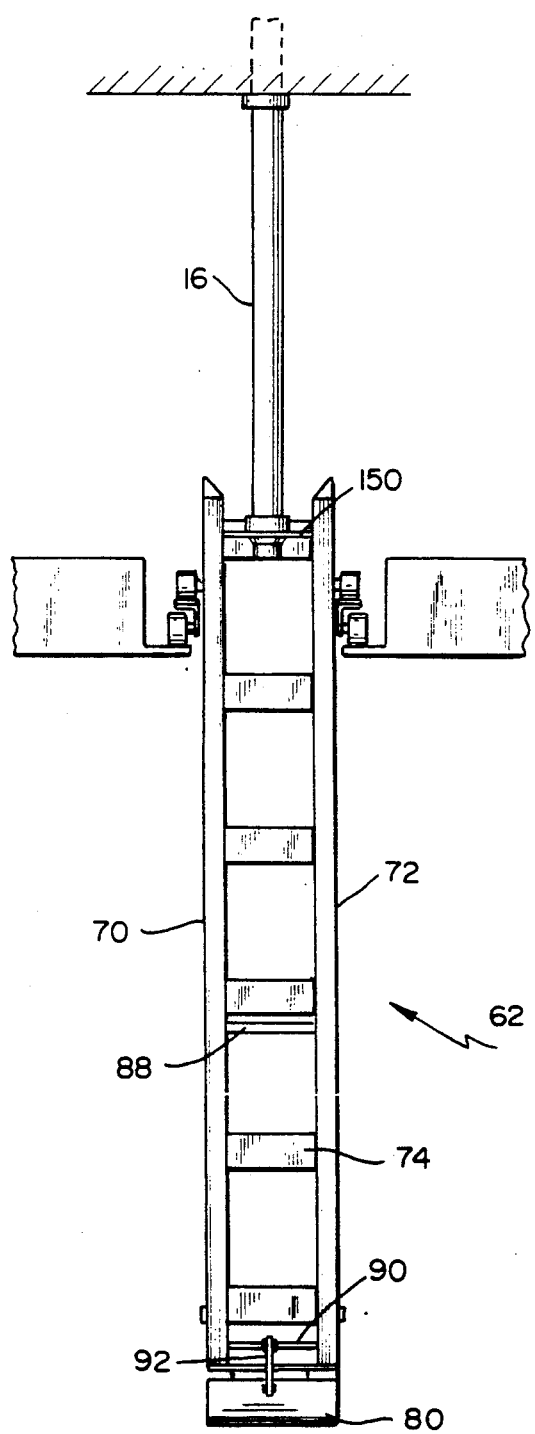
FIG. 16 is a front view of the control rod drive handling system showing the next stage of lowering a control rod drive for removal.

Referring now to FIG. 16, a load transfer plate 150 is slid into place in tower 62 to bear the load of control rod drive 16 while elevator platform 88 is lowered further to disengage extension piece 82 from the bottom of control rod drive 16. Extension piece 82 is then removed, supported by an integral hanger, and swung aside in preparation for the next step in removal. With extension piece 82 removed, elevator platform 88 is moved upward to assume support of control rod drive 16. Load transfer plate 150 is removed.

Figure 17:
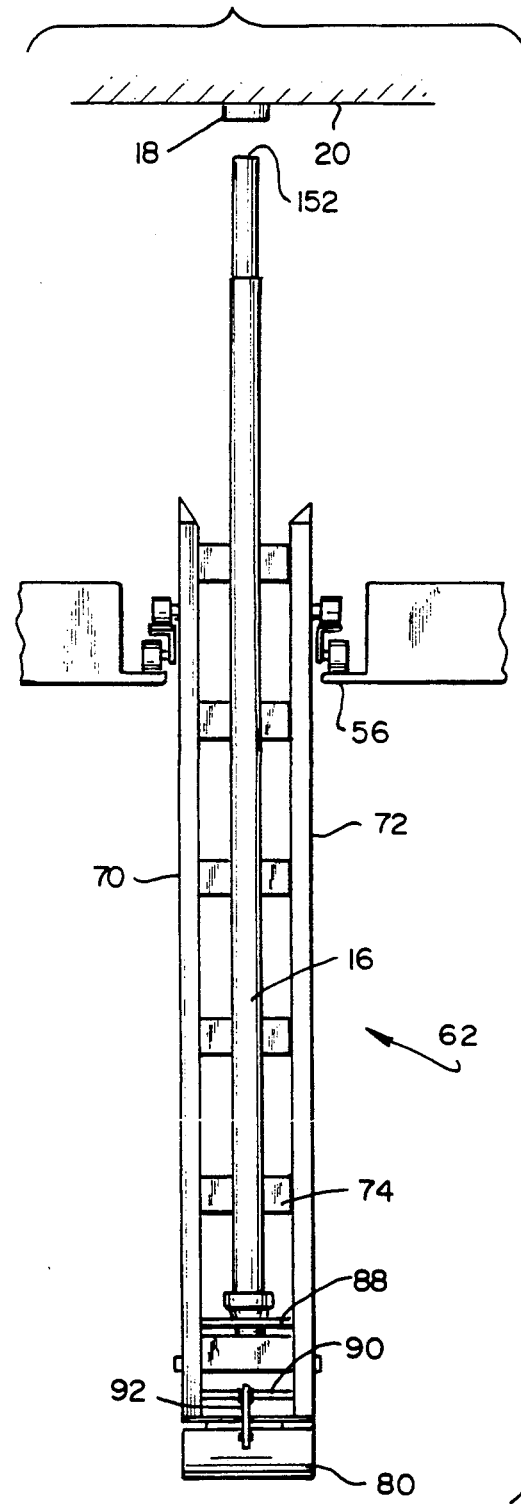
FIG. 17 is a front view of the control rod drive handling system showing the final stage of lowering a control rod drive for removal.

Referring now to FIG. 17, elevator platform 88 is lowered until a top end 152 of control rod drive 16 is clear of flange 18.

Figure 18:
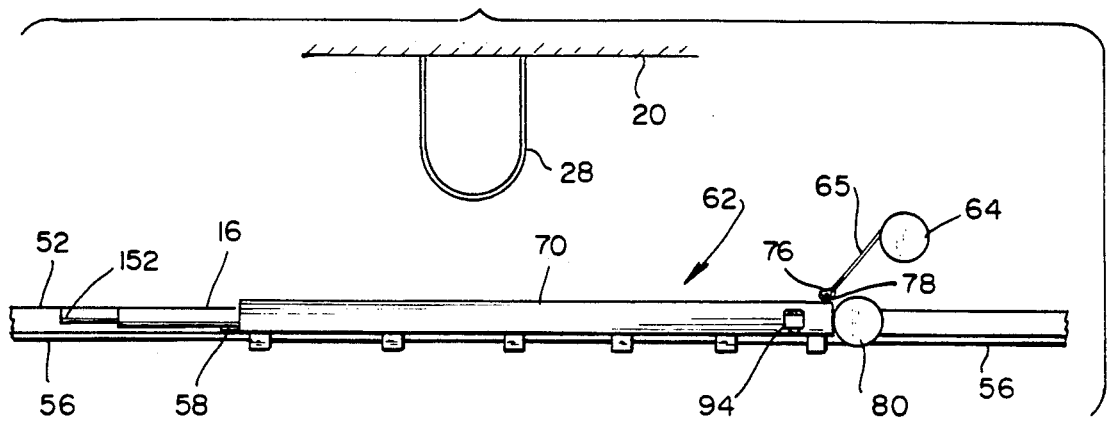
FIG. 18 is a side view of the control rod handling system wherein the tower is rotated into the horizontal position.

Referring now to FIG. 18, winch 64 is actuated to raise the lower end of tower 62 until retractable wheels 94 and 96 are above rails 56. In this raising operation and by referring to FIGS. 7, 8, 17 and 18, it is seen that the entire tower structure is pivoted or rotated to effect this raising. As FIG. 8 shows, an upper end of the tower has support on trunnion cart 58 via the two journal shafts 100, 102 and their companion trunnion bearings 98, 104. The journal shafts 100, 102 serve as pivot points so that when cable 65 is taken up, the lower tower end is lifted and the whole tower structure pivots about these said pivot points to bring the tower lower end slightly above horizontal. The short length of tower 62 seen extending above rail 54 in FIG. 8 will of course also pivot, but downwardly slightly as part of the shifting of tower orientation from vertical to generally horizontal. Then, retractable wheels 94 and 96 are moved into their outward unretracted positions, and cable 65 is paid out slightly until retractable wheels 94 and 96 rest on rails 56 to support the end of tower 62. Safety hook 76 is disengaged from eye 78 so that tower 62 is converted to a rollable cart which can be rolled out through door 40 (FIG. 1). Tower 62 can similarly be used to move control rod drive 16 inward through door 40 in preparation for installation.

In some installations, the bottom of door 40 is raised a substantial distance above work surface 42. Generally a ramp (not shown) is provided so that materials can be rolled up and down between the two levels. Such a ramp could contact top end 152 of control rod drive 16 during the transition from work surface 42 to the ramp, possibly causing damage.

Referring again to FIG. 6, lead cart 66 solves the problem of maneuvering control rod drive 16 in tower 62 onto a ramp without damaging top end 152 of control rod drive 16. When tower 62 is brought to the horizontal position, the protruding end of control rod drive 16 is clamped into clamps 154 and 156 in lead cart 66. Thus, as tower 62 and control rod drive 16 are moved onto a ramp, lead cart 66 rolls up the ramp to raise top end 152. It may be desirable to block rotation of control rod drive 16 with respect to tower 62. In this event, when lead cart 66 rolls up a ramp, trunnion cart 58 may be raised off rails 56, thereby leaving control rod drive 16 and tower 62 supported by lead cart 66 and retractable wheels 94 and 96.

Two additional problems are solved by the present invention. When the seal between flanges 18 and 22 is first cracked during removal, an initial burst of contaminated water pours out through the gap between them. In the most common situation, this water pours down over the workers below. Although the workers wear protective clothing and breathing gear, it is considered undesirable to permit such contaminated water to fall on them. One Japanese Utility Model Application Publication NO. 57-49834, employs a sump that can be affixed to the control rod drive to catch and channel away water as the seal between flanges 18 and 22 is cracked.

Top end 152 of control rod drive 16 is located closest to the nuclear reaction in reactor vessel 14, and a filter therein tends to collect radioactive contaminants. Thus this area is much more radioactive than is the remainder of control rod drive 16. In the prior art, a cylindrical lead radiation shield pig is placed over top end 152 to shield against the radiation in this area. A lead cylinder of the required size and thickness is relatively heavy and difficult to handle quickly. Thus, more radiation exposure occurs than is desirable. The present invention addresses this problem with a radiation shield pig that permits faster and more positive installation of shielding upon top end 152.

Figure 19:
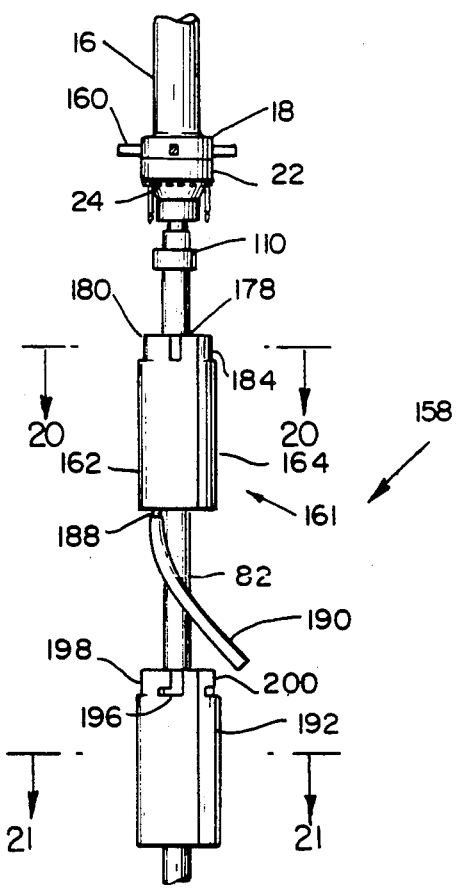
FIG. 19 is a partially disassembled view of an effluent container according to an embodiment of the invention.
Figure 20:
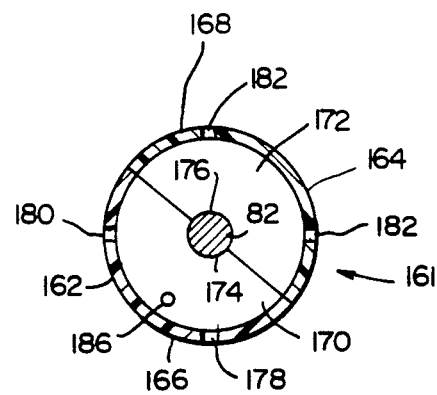
FIG. 20 is a cross section taken along XX—XX in FIG. 19.
Figure 21:
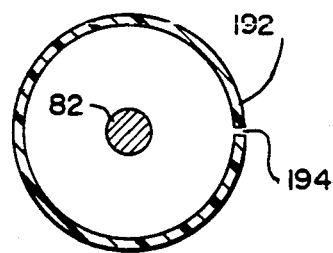
FIG. 21 is a cross section taken along XXI—XXI in FIG. 19.

Referring to FIGS. 19-21, an effluent container 158 is shown with its elements partially installed to catch and channel effluent water that will escape between flanges 18 and 22 when the seal between them is broken.

Four sway braces 160 are conventionally disposed, 90 degrees apart, in contact with each flange 18. A water container 161 consists of two halves 162 and 164 having half-cylindrical sidewall 166 and 168 with half-circular bottoms 170 and 172, respectively. Bottoms 170 and 172 include semi-circular cutouts 174 and 176, respectively which, when halves 162 and 164 are fitted together, form a close fit to the outer peripheral surface of extension piece 82. Four notches 178, 180, 182 and 184 are positioned and sized to slip over the four sway braces 160. A hole 186 in bottom 170 is connected to a drainage nipple 188 outside water container 161. A flexible hose 190 carries off water that falls into water container 161.

A clamp cylinder 192 consists of a right circular cylinder having a single vertical split 194 therein. The material of clamp cylinder 192 is resilient enough to permit deformation to expand split 194 sufficiently to pass over extension piece 82. Four L-shaped slots 196, 198, 200 and 202 (L-shaped slot 202 is hidden in the figure), are disposed in the upper edge of clamp cylinder 192. The L-shaped slots fit upon sway braces 160 and, when clamp cylinder 192 is rotated slighty, hook over the top thereof to retain clamp cylinder 192 in the installed position. In this position, clamp cylinder 192 holds the two halves of water container 161 together.

In use, bolts 24 are removed while a strong upward force is exerted on control rod drive 16 through extension piece 82. This prevents any substantial leakage during the initial stages. Halves 162 and 164 are assembled upon extension piece 82 with notches 178, 180, 182 and 184 engaging their respective sway braces 160. Split 194 is opened to permit slipping clamp cylinder 192 over extension piece 82. Clamp cylinder 192 is slid upward over the outside of water container 161 and L-shaped slots 196, 198, 200 and 202 are latched over their respective sway braces 160.

Extension piece 82 is then lowered slightly to break the seal between flanges 18 and 22. This permits liquid effluent to drain into water container 161 and thence through 190 to a location where it can be controlled. Control rod drive 16 may be lowered still further as desired. At some point, water container 161 begins sliding downward within clamp cylinder 192, which stays in place.

The fit between mating edges of halves 162 and 164 is close enough to limit leakage therepast to a very small amount. Similarly, the fit of semi-circular cutouts 174 and 176 is close enough to limit leakage. Although gasketing could be used on these mating surfaces to reduce even further the leakage, such an addition may not be needed since the principal goal of eliminating the shower of contaminated water has been substantially attained.

Water container 161 and clamp cylinder 192 may be made of any convenient material. We have discovered that a plastic resin, and especially a polycarbonate plastic resin, has suitable properties of lightness, strength and resilience for these parts. Typical polycarbonate resins are transparent. This provides the important benefit of permitting a worker to see the flow of water inside, and thus to monitor proper drainage, and to determine when substantially all of the water flow is completed.

Figure 22:
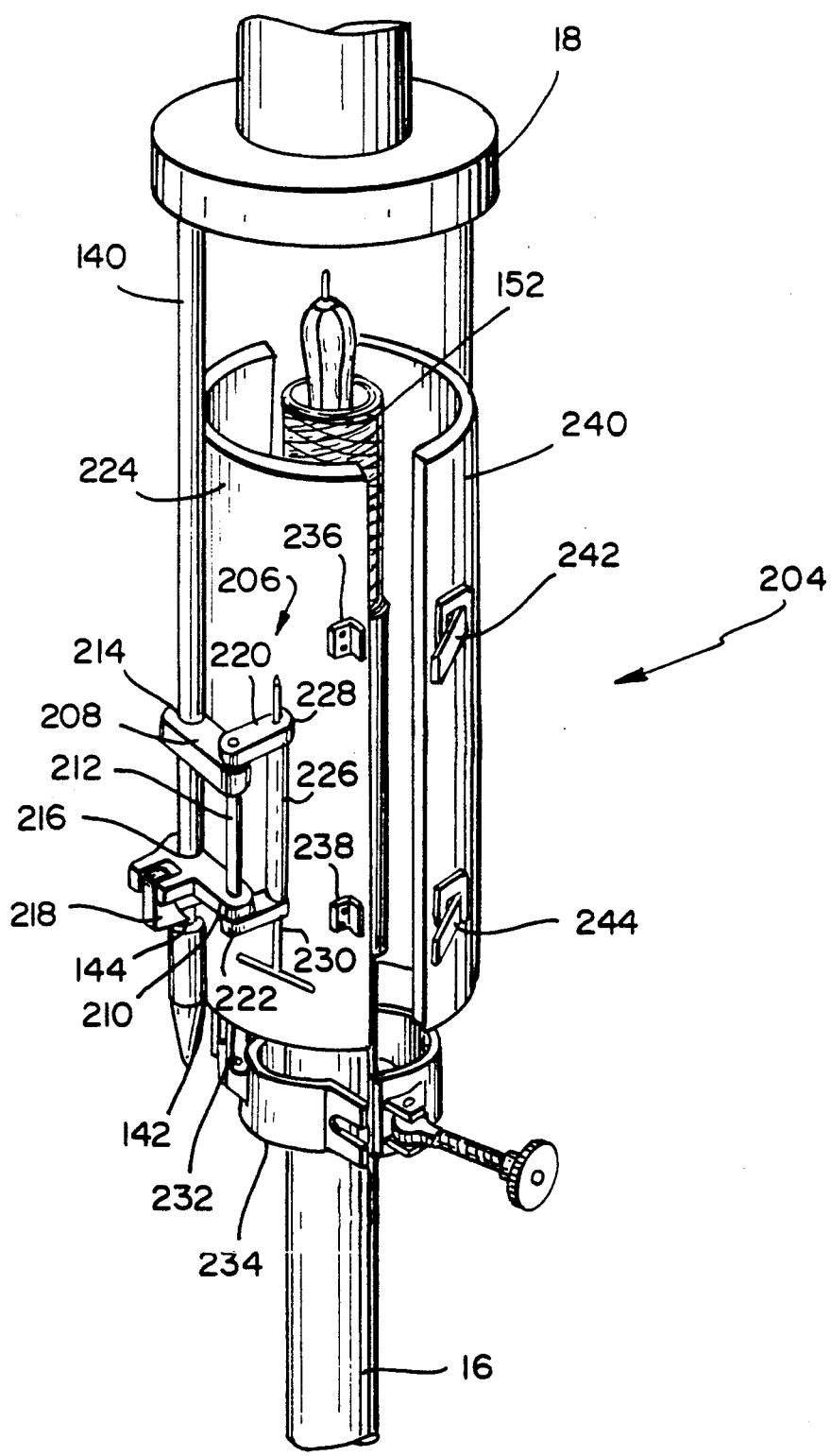
FIG. 22 is a perspective view of a radiation shield pig according to an embodiment of the invention.

Referring now to FIG. 22, there is shown, generally at 204, a radiation shield pig according to an embodiment of the invention. A hanger assembly 206 includes a top bar 208 and a bottom bar 210 rigidly tied together in parallel spaced-apart relationship by a connecting pin 212. Top bar 208 includes a hole 214 therein fittable over guide rod 140. Similarly, bottom bar 210 includes a hole 216, axially aligned with hole 214 and also fittable over guide rod 140. A spring-loaded latch 218 snaps into a latching position in narrow diameter portion 144 when hanger assembly 206 is slipped upward onto guide rod 140. First and second swing arms 220 and 222 are pivoted to connecting pin 212.

A half shiedl 224, of semi-cylindrical shape, includes a connecting loop 226 on an outer surface thereof. Each of swing arms 220 and 222 includes a hole 228 (hole 228 in swing arm 222 is not visible in the figure) to receive a connecting pin 230, which also passes through connecting loop 226 to pivotably affix half shield 224 to guide rod 140.

A clamp hanger 232, affixed to half shield 224 at its upper end, is pivotably attached at its lower end to a friction clamp half 234. First and second hooks 236 and 238 are disposed adjacent an edge of half shield 224. A second half shield 240 inlcudes elements thereon that correspond to those on half shield 224. First and second luggage latches 242 and 244 are positioned where they can be engaged with hooks 236 and 238, respectively on half shield 224. A further pair of luggage latch components is hidden adjacent the rear mating surfaces of radiation shield pig 204. In a further embodiment, only one latch is used at each side of radiation shield pig 204.

In use, while top end 152 of control rod drive 16 is still well above flange 18, the two half shields 224 and 240 of shield pig 204 are installed on guide rods 140 in the unengaged position shown. Then, when the highly radioactive top end 152 emerges from flange 18, luggage latches 242 and 244 are latched to form a complete cylinder about top end 152, and the two friction clamp halves 234 are clamped together about control rod drive 16, whereby shield pig 204 is firmly secured to control rod drive 16. Then the two connecting pins 230 (one hidden in the figure) are pulled. This releases radiation shield pig 204 for movement with control rod drive 16.

This required actions following emergence of top end 152 are accomplished rapidly and positively, whereby a minimum of radiation exposure occurs.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In apparatus for handling a nuclear reactor control rod drive within the confines of a sub-pile room situated below the nuclear reactor as an adjunct of control rod drive removal from or installation in the nuclear reactor which apparatus includes a generally horizontally disposed work platform in said sub-pile room, the work platform including a slot therein and there being opposed support rails in the slot, an elongated tower comprised as a structure of spaced side rails and cross braces extending therebetween, the tower having a pivot means carried in each side rail adjacent a first tower end with wich the tower can be supported in generally vertical disposition from the support rails under a control rod drive location so that a control rod drive can be lowered onto or raised up from said tower during a respective removal or installation, means for applying lifting force to an opposite end of said tower to pivot said tower when vertically disposed at the pivot means and therewith orient the tower and a control rod drive carried therein to horizontal disposition, and normally retracted roller means fixed to each side rail of the tower at the tower opposite end, said roller means when extended with the tower in horizontal disposition having supported rolling engagement contact with said support rails whereby said tower opposite end is maintained at horizontal orientation solely by said roller means so that the tower is converted to a rollable cart structure for transport therewith of the control rod drive along said support rails to an outlet from said sub-pile room to another space.

2. The apparatus of claim 1 in which the pivot means include trunnion shafts fixed to the tower side rails and received in roller bearings set on a rollable trunnion cart movable along the support rails.

* * * * *